(No Model.)
A. STORY.
CAR COUPLING.
No. 306,363. Patented Oct. 7, 1884.
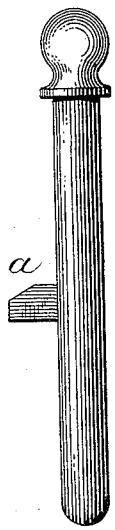
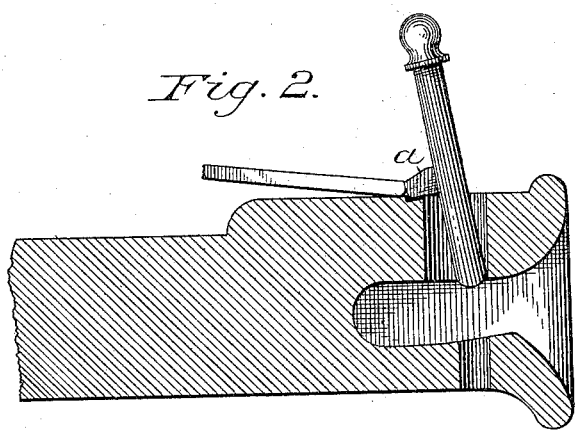
Witnesses:
Allen H Hickok
Jas. E. Story
Inventor:
Alex. Story

United States Patent Office.

ALEXANDER STORY, OF WASHINGTON, IOWA.

CAR-COUPLING.

SPECIFICATION forming part of Letters Patent No. 306,363, dated October 7, 1884.

Application filed July 10, 1884. (No model.)

*To all whom it may concern:*

Be it known that I, ALEXANDER STORY, a citizen of the United States, residing at Washington, in the county of Washington and State of Iowa, have invented certain new and useful Improvements in Car-Couplings; and I do hereby declare the following to be a full, clear, and exact description of the invention, such as will enable others skilled in the art to which it appertains to make and use the same.

My invention is an improvement in car-couplings so arranged that cars coming together will couple automatically.

It is simple, durable, and reliable at all times.

It consists, mainly, in the peculiar shape of the coupling-pin, as shown in Figure 1, together with draw-head adapted to its use, as shown in Fig. 2.

In the drawings, Fig. 1 represents the coupling-pin, with its hook *a*. Fig. 2 represents a longitudinal vertical section of an ordinary draw-head, with flaring mouth, enlarged upper side, with hole to adapt it to pin with hook, with pin resting by its hook on top, with arm extending from "dead-wood" to the hook.

The coupling-pin is an ordinary one, but longer and with side hook, as shown in Fig. 1. The hook is thinner somewhat than the pin proper. The upper part of the draw-head, as shown in Fig. 2, is thicker than the lower. The distance from the top, where the hook rests, Fig. 2, to the opening in the draw-head is exactly the length of the pin from the hook to its lower end, thus permitting the link to enter the draw-head without touching the pin. The hole in the upper side of the draw-head is so made that the pin and hook work up and down freely. The opening for the hook is made large enough to permit the pin to enter it far enough to let the hook rest on top of the draw-head, except at the lower part. The lower end of the pin is directly above the lower hole, while the top is inclined toward the car. Then, when the approaching link enters and the two draw-heads come together, the arm, Fig. 2, shoves the pin into a perpendicular position, when it drops through the link into the lower hole, and the coupling is done, the spring at the inner end of the draw-head permitting the draw-head to be driven inward sufficiently to accomplish the work. The hook, when in place, rests on the end of the link, and holds it in a horizontal position when uncoupled, ready to enter the mouth of the approaching draw-head. The outer end of the link may be a little higher than the inner, which, with the flaring mouth, better fits it for overcoming inequalities in the height of cars to be coupled. The lower side of the opening inclines downward inwardly from the mouth, forming a cavity, in which the end of the link works freely. The place on top of the draw-head on which the hook rests is one-half or three-fourths of an inch lower than at the sides of the hook, thus preventing the hook from turning to either side and hindering the pin from dropping into place.

Having thus described my invention, what I claim is—

A coupling-pin with a peculiar-shaped hook on its side near the middle, with upper side of draw-head enlarged, having hole to match pin, with hook-rest on top a little lower than at the sides of the hook, and recess in lower part of draw-head, which draw-head has flaring mouth, as described and specified, also with arm extending from the car to the hook.

ALEXANDER STORY.

Witnesses:
ALLEN HICKOK,
J. E. STORY.